Figure 1A:
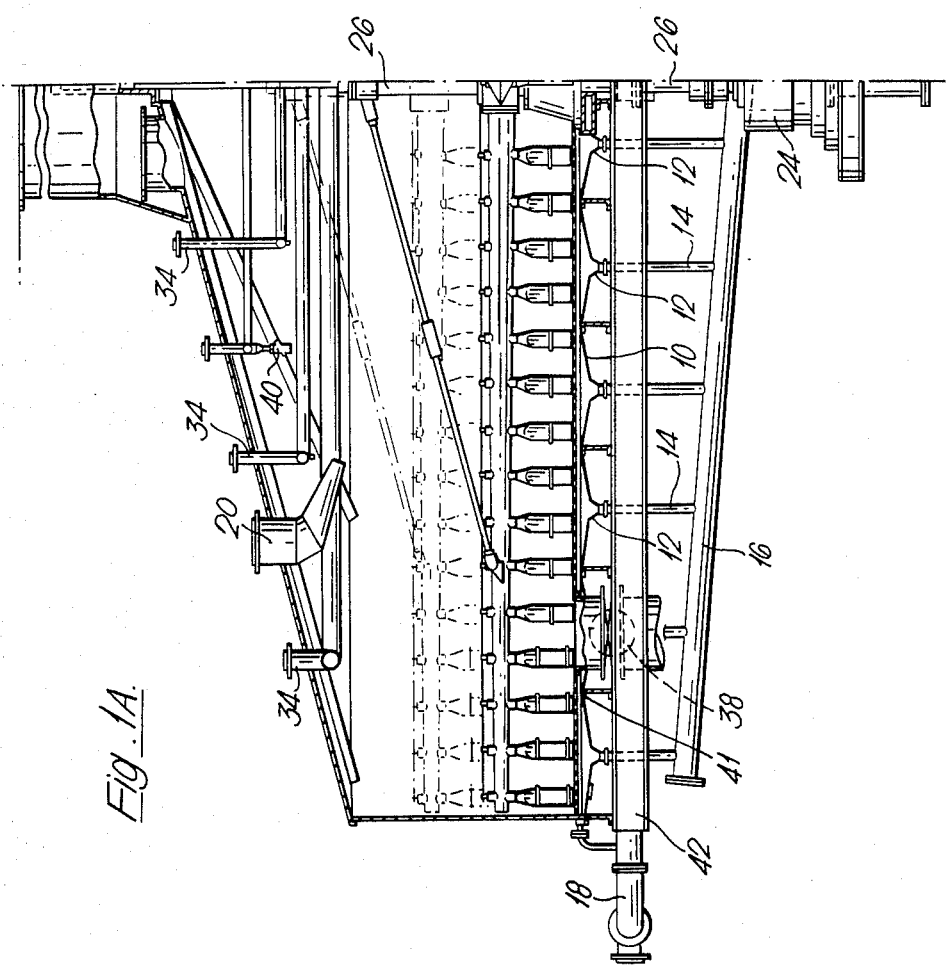

United States Patent [19]

Raines

[11] Patent Number: 4,505,941

[45] Date of Patent: Mar. 19, 1985

[54] LAUTER TUNS

[75] Inventor: David W. Raines, Tutbury, England

[73] Assignee: Robert Morton DG Limited, England

[21] Appl. No.: 261,004

[22] Filed: May 6, 1981

[30] Foreign Application Priority Data

May 7, 1980 [GB] United Kingdom ............... 8015138

[51] Int. Cl.³ ........................... A23L 1/28; C12G 1/02
[52] U.S. Cl. ................... 426/489; 99/277.1;
426/29; 426/490; 426/495; 435/93
[58] Field of Search ................... 99/277, 277.1, 277.2,
99/276, 278; 435/310, 317, 93; 210/293, 423;
426/489, 490, 495, 29

[56] References Cited

U.S. PATENT DOCUMENTS 2,262,863 11/1941 Schock ............................... 210/428
3,653,845 4/1972 Moravec ............................ 210/293
4,361,080 11/1982 Smith ................................ 99/277.1

Primary Examiner—Robert W. Jenkins
Attorney, Agent, or Firm—Wood, Herron & Evans

[57] ABSTRACT

Lauter tuns are used for the filtration of wort during brewing. In use the wort runs off through a filter bed and has to be collected. Hitherto the bottom of such tuns have been flat having a number of holes through which the wort runs. If the bottom is ostensibly flat, problems can arise in that puddles accumulate in any undulations leading to possible spoilation of the wort. The bottom of a tun in accordance with the invention is formed with a series of straight parallel valleys extending across the tun and having spaced wort collection points for connection to straight wort mains or manifolds located beneath the tun.

8 Claims, 4 Drawing Figures

LAUTER TUNS

This invention relates to brewing apparatus and in particular to Lauter tuns for the filtration of wort during brewing.

Lauter tuns are used in a brewery to separate the sweet worts from a malted barley/adjuncts mash fed from a standard mash mixer. A filter bed is formed in the base of the Lauter tun and after knives have acted on the filter bed to keep the filter bed open, the worts run-off through the bed and through a filter plate on which the filter bed rests, into the bottom of the tun. The tun bottom has either a number of collection points in the form of holes through a flat bottom of the tun or, with a cone tundish arrangement, a single central sump acting as a collection point to which the wort is directed by the conical shape of the bottom of the tun.

If the bottom wall of the tun is flat, problems arise as it is inherently difficult to level a truly flat surface with the result that puddles tend to form and these puddles can be of caustic liquid used for cleaning, which clearly can very adversely affect the brewing process.

Tuns having a central sump are expensive to manufacture and tend to collect an undesirably high volume of first worts.

In an effort to overcome the problems presented by these two types of bottom wall construction, it has been proposed to form the bottom wall of the tun with a number of valleys arranged in concentric rings, each valley having a number of wort collection points connecting with ring mains positioned beneath the tun. This arrangement works well from the point of view of wort collection but it is expensive, as it requires ring mains and circular valleys and a tortuous steel support structure.

A Lauter tun in accordance with this invention has a bottom wall formed with, or of, a series of straight, parallel, preferably regularly spaced, valleys, extending across the tun from one side to an opposite side, each valley having a number of spaced wort collection points for connection to straight wort mains or manifolds beneath the tun.

Such an arrangement of valleys and wort mains is relatively cheap to manufacture and simple to install. The necessary steel support structure is also relatively cheap to produce and install.

It is believed that such an arrangement of valleys which may have sloping sides at an angle of from 3° to 8°, preferably about 8°, to the horizontal, leads to an improvement in the hydraulic balance in the void under the filter plate, i.e. vortices are reduced, giving a higher flow rate through the filter bed and out from the wort collection points.

It is also believed that the number of wort collection points for each valley may be reduced to, for example, only two for each valley. This reduces the number of wort manifold connections and hence the possibility of manifold blockages. Any blockages which do occur may be easily removed, e.g. by rodding due to the straight run of the manifolds (mains).

As an example, the pitch or distance between adjacent valleys may be a 1000 mm on a tun having an inside diameter of about 12.25M.

Figure 1B:
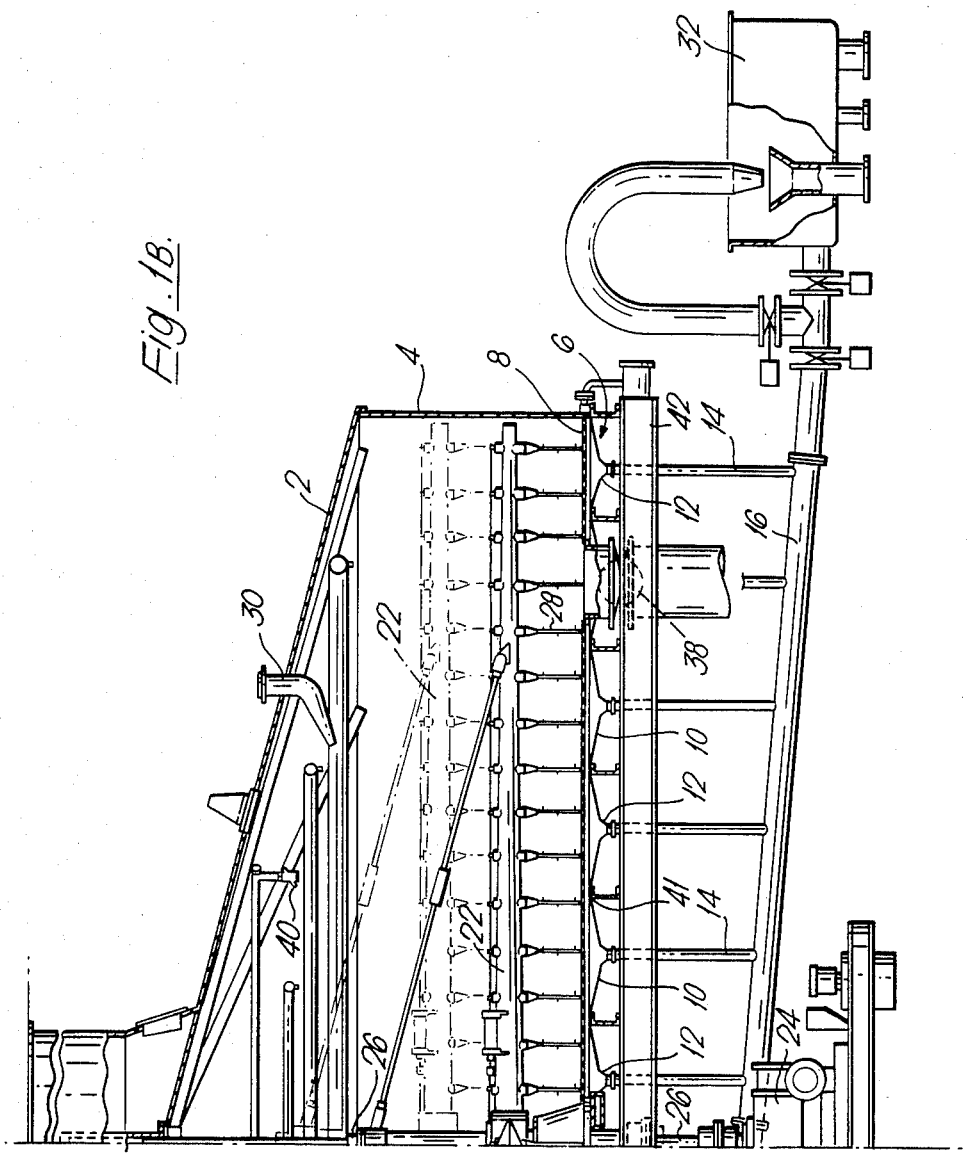
Figure 2A:
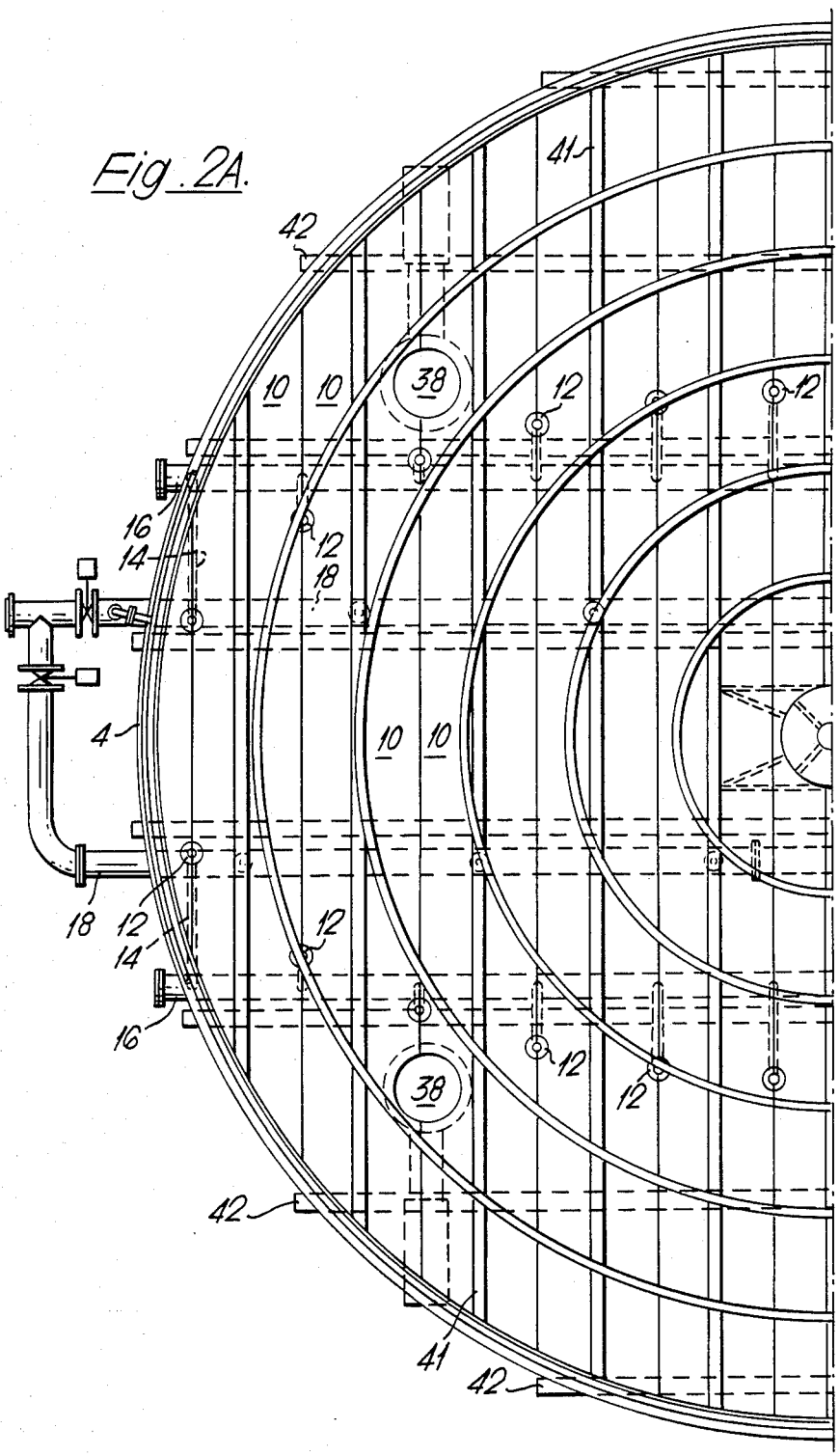
Figure 2B:
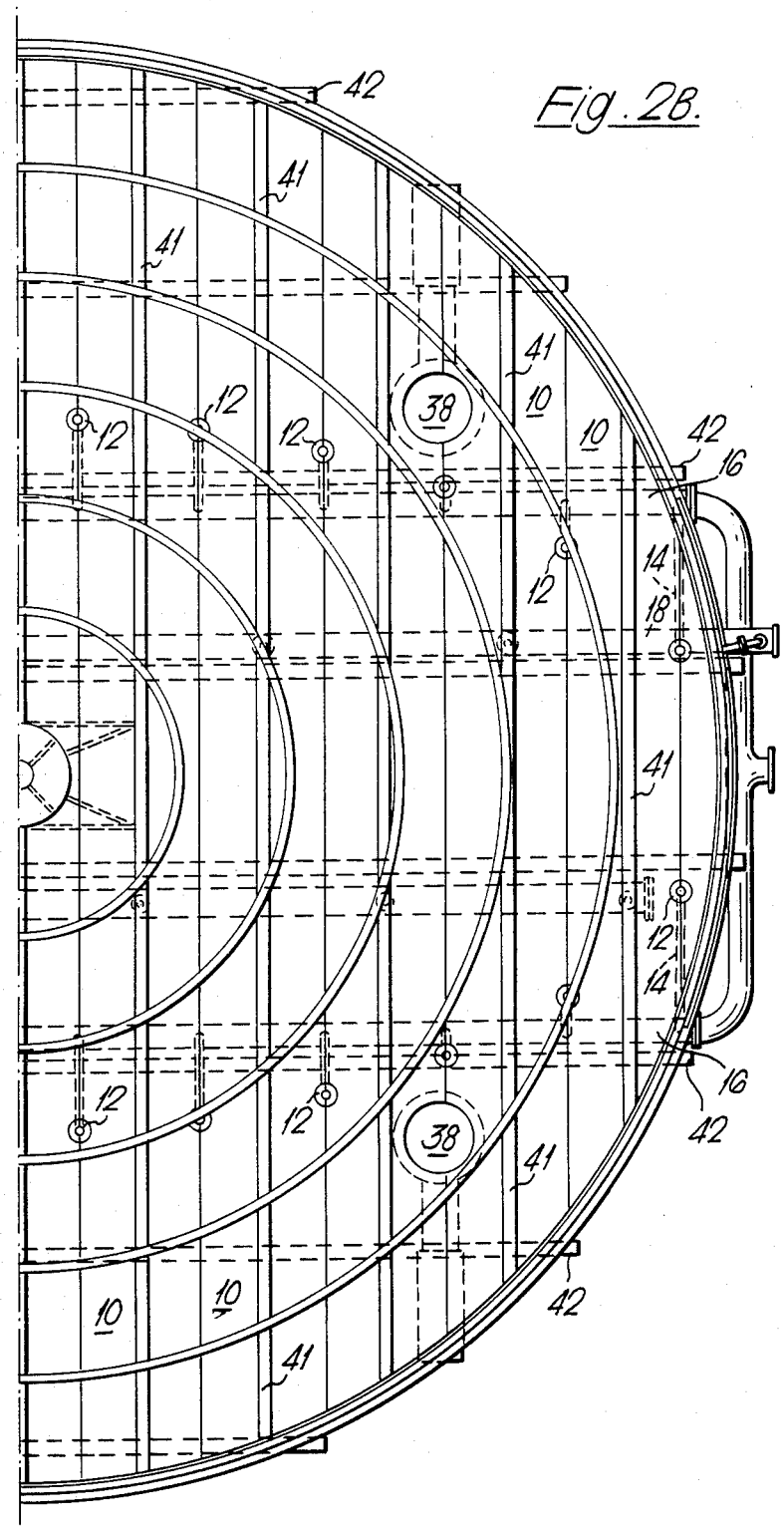

The invention will now be further described by way of example with reference to the accompanying drawings in which:

FIG. 1A is a section of the left side through one embodiment of Lauter tun in accordance with the invention, and FIG. 1B is a section of the right side FIG. 2A is a plan view of the left side of the bottom of the tun shown in FIG. 1 and FIG. 2B is a view of the right side.

The tun shown in the drawings is circular and is formed with an upper conical wall generally indicated at 2, straight vertical sides 4 and a bottom wall 6. A filter plate 8 is mounted above the bottom wall.

The bottom wall 6 is formed into a series of straight valleys, the sloping walls 10 of which are at an angle of about 8° to the horizontal. Each valley extends in a straight line across the tun from one side to another as can clearly be seen in FIG. 2. The valleys are regularly spaced apart across the tun as can be seen in FIG. 1.

Two outlets 12 are provided for each valley spaced apart along the length of the valley as can be seen in FIG. 2 and each outlet is connected by pipework 14 with a worts main or manifold 16 which, as can be seen in FIG. 2, extends in a straight line across the tun beneath the bottom wall at right angles to the valleys 10.

It will be seen that the valleys 10 are positioned closely beneath the filter plate 8 so as to reduce, as much as possible, the void or space beneath the plate 8. The possibility of vortices forming and unbalancing the hydraulic gradient at filter plate 8 and wort outlet 12 interface, is minimised by using flared entrance connections 12 into the collection pipework 14.

In use and as is conventional, the tun is first underlet, the underlet liquor entering the tun body through a mains pipe 16 and up through the pipework network 14 and outlet points 12 to a level of about 25 mm above the filter plate 8.

Mash from a standard mash mixer, is then introduced into the top portion of the tun through inlets 20 passing through the sloping walls 2. This mash is prevented from being driven into the apertures in the filter plate due to the cushioning effect of the underlet liquor previously introduced.

As the mash enters, a carriage 22 is rotated by means of a drive motor 24 driving shaft 26, above the mash which is building-up to form a bed on the filter. Knives 28 carried by the carriage act to cut into the mash to keep the bed open and also act to spread the mash over the plate 8.

Once the bed has been formed the carriage 22 is raised to the position shown in dash lines in FIG. 1 and stops rotating.

Liquor is then removed out through the manifold 16 and is recirculated through the inlet 30 until the worts start to become clear.

Due to the small void beneath the filter plate 8, this recirculation occurs relatively rapidly.

Clear worts passing from the filter bed then enter the valleys 10 and flow to the outlet 12 and into the main worts manifold 16 for collection in a wort grant 32.

Finally, and again as is conventional, sparge liquor is introduced onto the top of the bed through inlets 34 and ring mains to distribute the liquor over the bed, and the process continues.

After each process has been terminated, the spent grains pass out through outlets 38 and the tun body is flushed to clean it by introducing flush liquid through spray heads 40 and through the inlet 18 and headers 41.

As can clearly be seen in the drawings, the support steel work, e.g. the I section girder 42, shown in FIG. 1, can be straight leading to further economy.

I claim:

1. A lauter tun comprising
   side walls and a bottom wall,
   a series of straight valleys formed integral with said bottom wall, said valleys extending in parallel fashion one with another throughout the breadth of said bottom wall, and said valleys each extending across said bottom wall between opposite points on the side walls of said tun,
   at least one wort collection point positioned at the bottom of each valley, and
   a wort manifold located beneath said tun, said manifold being connected by pipework with said valley collection points.

2. A lauter tun as claimed in claim 1, the space between adjacent parallel valleys in said bottom wall being substantially equal.

3. A lauter tun as claimed in claim 1, at least one of said valleys in said bottom wall have sloping sides which define an angle of from between about 3° to about 8° to the horizontal.

4. A lauter tun as claimed in claim 1, said wort manifold being positioned to extend across said tun at a generally right angle to said valleys in said bottom wall.

5. A lauter tun as claimed in claim 4, each of said wort collection points comprising
   an outlet hole connected to a sump at the bottom of said valley, the walls of said sump being flared.

6. A lauter tun as claimed in claim 1, including
   a filter plate mounted closely above said bottom wall.

7. A method of forming wort liquor in a brewing process, said method comprising the steps of
   providing a lauter tun in which the bottom wall of said tun is comprised of a series of straight valleys formed integral with said bottom wall, said valleys extending in parallel fashion one with another throughout the breadth of said tun, and said valleys each extending across said bottom wall between opposite points on the side walls of said tun,
   establishing a bed of mash on top of a filter plate positioned within said tun, said filter plate being spaced above the bottom wall of said tun,
   filtering wort liquor through said mash bed on said filter plate,
   collecting said wort liquor in said spaced parallel, straight valleys, and
   draining said wort liquor from said valleys at at least one location within each valley, said wort liquor being drained into a wort manifold positioned beneath the bottom wall of said tun.

8. In a lauter tun or like vessel for containing material to be treated, the vessel having a perforated false bottom for draining liquid from the material being treated and a real floor including a discharge outlet below the false bottom for collecting the drained liquid, the improvement wherein:
   (a) said real floor includes a plurality of elongated parallel linear troughs substantially identical in cross section, each of said troughs extending unobstructed across substantially the entire bottom of said vessel to facilitate access to said troughs from without said vessel for cleaning and the like,
   (b) each of said troughs forms in cross section a relatively shallow, upward opening V-shape for receiving liquid draining through said perforated false bottom,
   (c) the totality of said plurality of troughs is cut to the shape of said vessel to fit thereto as the bottom thereof.

\* \* \* \* \*